No. 635,205. Patented Oct. 17, 1899.
G. W. & W. H. TAYLOR.
COMBINED COTTON CHOPPER AND HARROW.
(Application filed June 14, 1897.)
(No Model.) 2 Sheets—Sheet 1.
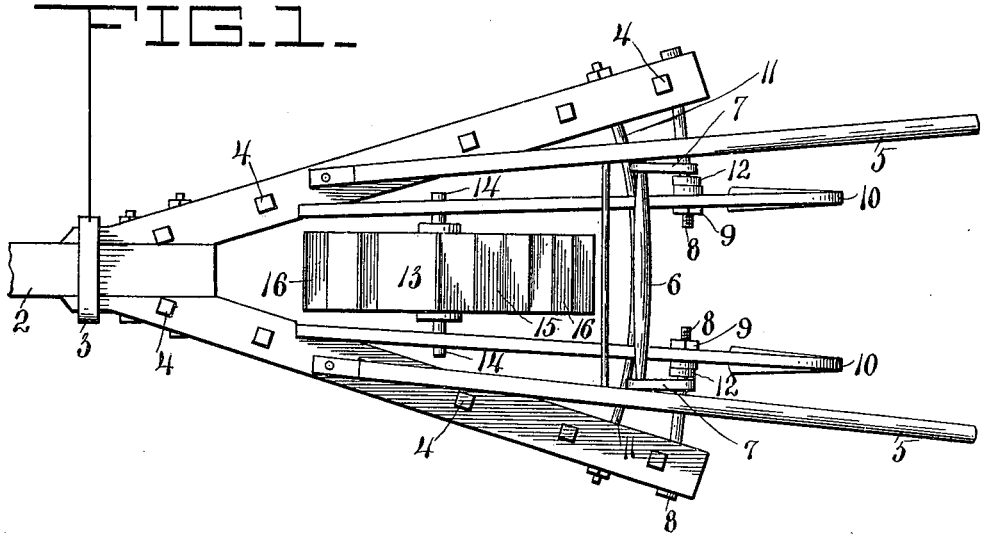
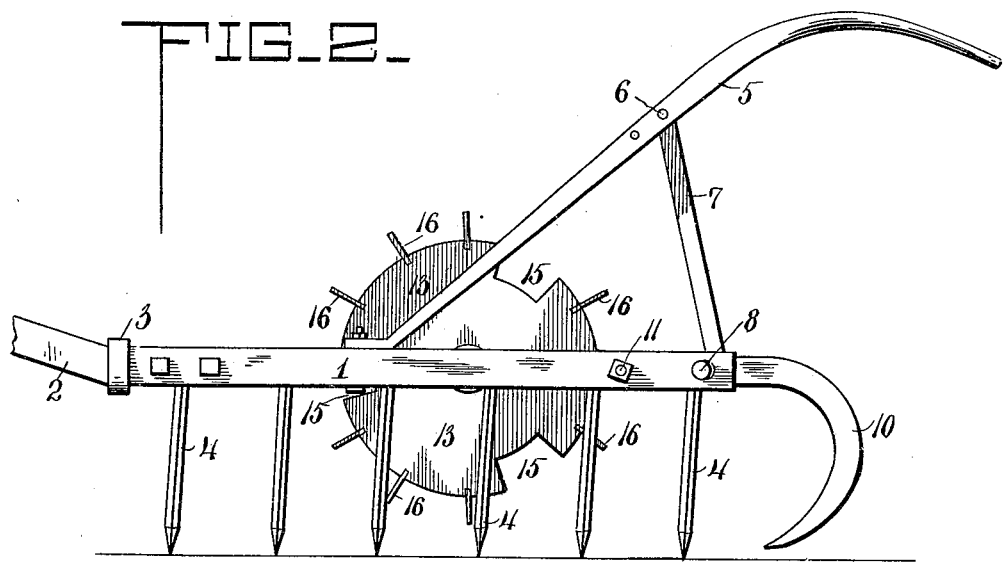
Witnesses
W. E. Allen
Victor J. Evans
George W. Taylor, Inventors.
and Willis H. Taylor.
by John Wedderburn
Attorney
THE NORRIS PETERS CO., PHOTO-LITHO., WASHINGTON, D. C.

No. 635,205. Patented Oct. 17, 1899.
G. W. & W. H. TAYLOR.
COMBINED COTTON CHOPPER AND HARROW.
(Application filed June 14, 1897.)
(No Model.) 2 Sheets—Sheet 2.
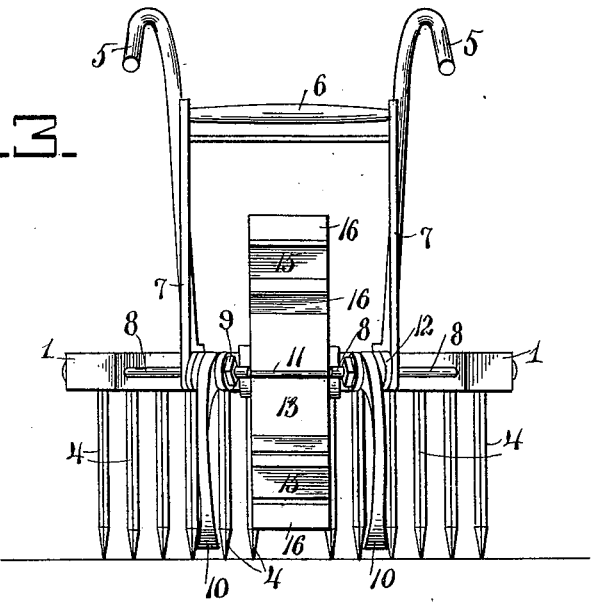
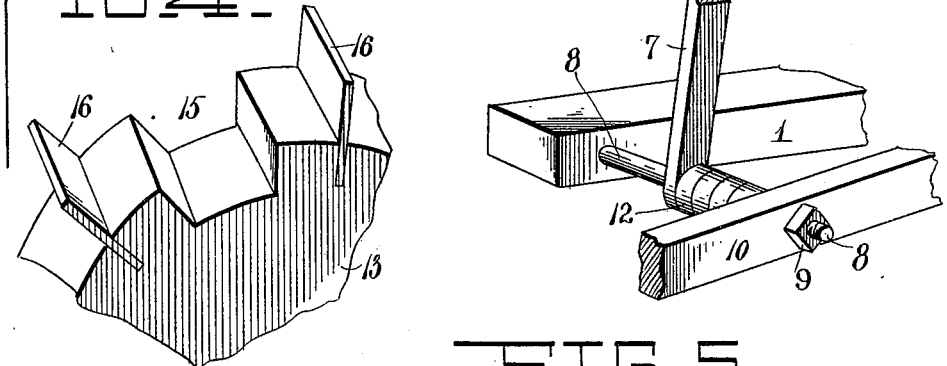
Witnesses
W. E. Allen
Victor J. Evans
George W. Taylor, Inventors.
and Willis H. Taylor.
by John Wedderburn
Attorney
THE NORRIS PETERS CO., PHOTO-LITHO., WASHINGTON, D. C.

UNITED STATES PATENT OFFICE.

GEORGE W. TAYLOR AND WILLIS H. TAYLOR, OF RED APPLE, ALABAMA.

COMBINED COTTON CHOPPER AND HARROW.

SPECIFICATION forming part of Letters Patent No. 635,205, dated October 17, 1899.

Application filed June 14, 1897. Serial No. 640,765. (No model.)

*To all whom it may concern:*

Be it known that we, GEORGE W. TAYLOR and WILLIS H. TAYLOR, of Red Apple, in the county of Marshall and State of Alabama, have invented certain new and useful Improvements in Combination Cotton Choppers and Harrows; and we do hereby declare the following to be a full, clear, and exact description of the invention, such as will enable others skilled in the art to which it appertains to make and use the same.

This invention relates to improvements in cultivators, especially those for the cultivation of cotton-plants, and has combined therein a chopper, harrow, and cultivator, and it is not only adaptable for use when the plants are small, but by detaching a portion may be used at any stage of their development.

Our device is of simple character, certain and effective in action, and does not require any greater motive power than the ordinary plow or harrow.

In the drawings herewith forming part of this specification, Figure 1 is a top plan view of our improved cultivator. Fig. 2 is a side elevation. Fig. 3 is a rear elevation. Fig. 4 is a detail of the revolving portion or chopper. Fig. 5 is a detail view showing the manner of adjusting the cultivators.

In the construction of my improved cultivator I provide first a harrow-frame 1, consisting of two beams joined at their forward ends to a projecting tongue 2 in such manner as to form an acute angle. Said beams may be connected with said tongue by any suitable means and secured by one or more clamping-bands 3, each of said beams being provided along its length with depending harrow-teeth 4. We next provide, extending backwardly from the intermediate portions of the upper surface of said beams, handles 5, similar to plow-handles, provided with a transverse connecting-rod 6, and in connection with said rods two braces 7, each having its lower end secured to a hanger-rod 8, projected inwardly from the rear end of each of said harrow-beams, the said hanger-rods 8 being projected through the lower ends of said braces 7 and their inner ends screw-threaded and suitable nuts 9 provided therefor. We next provide two backwardly-extended plow-beams 10, preferably of iron, having their inner ends secured to the inner lateral surfaces of said harrow-beams by means of suitable bolts or otherwise. Said beams are projected in a horizontal plane and parallel with each other to a point rearwardly of the outer ends of said harrow-beam, then curved downwardly, so as to form supports for the attachment of plows or other cultivators. Said beams 10 are supported intermediately by means of a transverse curved rod 11, passing therethrough and also through each of said harrow-beams. These beams may be more widely separated from each other or brought closer together at their outer end by the employment of spacing-sleeves 12 between them and the hangers 7 when it is desired to bring them nearer together or by moving some or all of the washers when it is desired to distend them. We next provide a block wheel or roller 13, the peripheral width of which is approximately equal to that of the top surface of a cotton-row. The said wheel 13 is provided centrally with a transversely-placed and rigidly-secured spindle 14, having its ends journaled in registering apertures through the plow-beams 10, adjacent to their forward ends. The periphery of said block-wheel 13 is broken by a plurality of enlarged slots directed toward the center of the wheel, and the portions of the peripheries between the said slots 15 are provided with radially-projected blades or choppers 16, placed at predetermined distances apart. There may be, if desired, means for moving any one of these blades or adjusting them at variable distances apart. Any other auxiliary brace-rods or means for strengthening the frame portion may also be added, if desired.

The usual method of cultivating cotton-plants in their younger stages is to "bar off" the rows by throwing a lateral portion thereof into the furrow, after which the superfluous cotton-plants are chopped out by means of hoes, leaving a sufficient "stand" at regular intervals, after which the earth is thrown back from the furrows toward the plants. This operation requires that the plow be run twice the entire length of each furrow in the process of barring off, after which the sweeps must be run through each furrow to throw the earth back toward the plants after they have been chopped out. By the use of our improved cultivator and chopper all the necessary operations are performed simultaneously, except the final throwing back of the earth, which is effected by the sweeps following our improved cultivator and chopper. When our device is used in this manner, the moldboards of the plows secured to each of the beams 10 should be turned outwardly. The distance between the plow-points can be readily adjusted to suit the character of the row by merely bringing the beams closer together or separating them more widely upon the ends of the projecting rods 8.

The function of the harrow-teeth 4 is to pulverize the earth in the furrow and somewhat in the sides of the rows and incidentally tear up any small vegetation which may be encountered.

By the use of our improved cultivator and chopper much labor and duplication of work upon the same cotton-row will be saved, while at the same time the chopping and pulverization are fully as effective as if done in the ordinary manner with barring-off plows and hoes.

Having thus described our invention, its construction, and uses, what we believe to be novel, and desire to secure by Letters Patent, is—

1. The combination with the frame of a harrow, of two plow-beams secured therein, means for laterally adjusting the rear ends of the plow-beams with respect to each other, a rotatable chopper-wheel located between and journaled in said plow-beams, said wheel being provided with a wide periphery having transverse radial slots, and radially-projecting and transversely-disposed chopping-blades intermediate the slots and parallel thereto, substantially as described.

2. A combined cotton cultivator and chopper, embodying a frame provided with harrow-teeth, handles thereon, plow-beams secured to the inner surfaces of the side bars of the frame, independent hanger-rods projecting inward from said beams, a curved rod extending transversely of said frame for supporting the plow-beams, means for adjusting said plow-beams laterally with relation to each other and longitudinally of said hanger-rods, and a chopper-wheel journaled in and between the plow-beams, substantially as set forth.

3. The combination, with a frame having rearwardly-diverging side bars, of inwardly-extending and transversely-disposed hanger-rods secured rigidly to the side bars of the frame, a pair of plow-beams connected at their forward ends to said frame and embracing said hanger-rods, adjusting-nuts on said rods, and spacing-sleeves on said rods whereby the distance between the plow-beams may be regulated and the beams held rigidly in their adjusted positions.

In testimony whereof we have signed this specification in the presence of two subscribing witnesses.

GEO. W. TAYLOR.
WILLIS H. TAYLOR.

Witnesses:
HENRY D. CAMPBELL,
CHARLES CARTER.